UNITED STATES PATENT OFFICE.

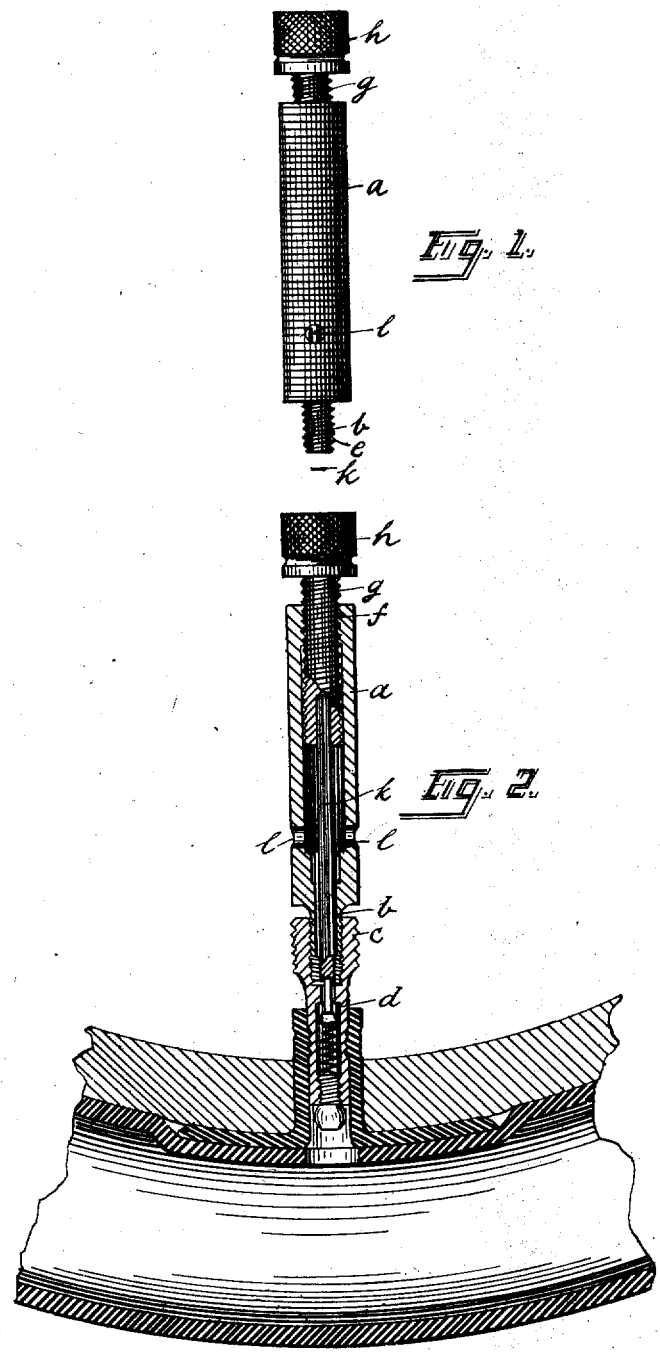

CORNELIUS A. CULP, OF PACIFIC GROVE, CALIFORNIA, ASSIGNOR TO CULP BROTHERS, OF SAME PLACE.

TIRE-DEFLATER.

SPECIFICATION forming part of Letters Patent No. 652,232, dated June 19, 1900.

Application filed September 27, 1899. Serial No. 731,858. (No model.)

*To all whom it may concern:*

Be it known that I, CORNELIUS A. CULP, a citizen of the United States, residing at Pacific Grove, in the county of Monterey and State of California, have invented certain new and useful Improvements in Tire-Deflaters, of which the following is a specification.

The object of my invention is to provide an improved device for maintaining open the valve of a pneumatic tire in order to deflate the tire and, furthermore, to provide such a device which can be readily used with valves of various depths.

My invention therefore resides in the novel construction, combination, and arrangement of parts for the above end hereinafter fully specified, and particularly pointed out in the claims.

In the accompanying drawings, Figure 1 is a side elevation of my improved device, and Fig. 2 is a longitudinal section of the device in position on a valve.

Referring to the drawings, $a$ represents a cylindrical sleeve having a contracted apertured end or nipple $b$, adapted to enter the outer end $c$ of a valve $d$ of a bicycle-tire and externally threaded, as at $e$, to engage the internal threads of said valve end. The upper end of said sleeve is internally threaded, as shown at $f$, to furnish an adjustable bearing for a screw $g$, having a milled head $h$ and carrying a push-rod $k$. The free end of said rod $k$ extends loosely into the aperture of the nipple $b$, so that when the device is screwed into the valve end the end of the rod $k$ abuts against the end of the valve-plunger and depresses the valve, and while the device is in position the valve is maintained open, thus permitting the air to escape. Space is left in the aperture of the nipple $b$ around the end of the push-rod $k$ to let the air escape from the valve, and from the interior of the sleeve $a$ the air finally escapes by lateral apertures $l$ in the sleeve. The end of the rod $k$ is concaved to better fit over the end of the valve-plunger. Since the push-rod $k$ is held in the sleeve $a$ adjustably, it can be moved in or out to fit different depths of valves.

The device may also be used by screwing on the sleeve $a$ after the push-rod $k$ has been withdrawn and then screwing in the push-rod to open the valve.

I claim—

1. A tire-deflater comprising a cylindrical sleeve constructed at its lower end to sit in the end of a tire-valve and threaded at its upper end and having a lateral aperture, and a push-rod having a threaded support to engage the threaded upper end of the sleeve, the lower end of the rod being adapted to abut against the upper end of the valve-plunger to depress the same, substantially as described.

2. A tire-deflater comprising a cylindrical sleeve having an externally-threaded nipple at its lower end, and internally threaded at its upper end and having a lateral aperture, and a push-rod having a threaded support screwed into the upper end of the sleeve, the lower end of the rod being adapted to abut against the upper end of the valve-plunger to depress the same, substantially as described.

In witness whereof I have hereunto set my hand in the presence of two subscribing witnesses.

CORNELIUS A. CULP.

Witnesses:
C. D. SMITH,
L. N. MCALLISTER.